United States Patent
Chen

(10) Patent No.: US 8,305,659 B2
(45) Date of Patent: Nov. 6, 2012

(54) SHEET-FED DOUBLE-SIDED DOCUMENT SCANNER CAPABLE OF CHANGING SCANNING MODES DEPENDENT ON POWER INPUT

(75) Inventor: Yen-Cheng Chen, Hsinchu (TW)

(73) Assignee: Avision Inc. (TW)

( * ) Notice: Subject to any disclaimer, the term of this patent is extended or adjusted under 35 U.S.C. 154(b) by 435 days.

(21) Appl. No.: 12/726,489

(22) Filed: Mar. 18, 2010

(65) Prior Publication Data

US 2011/0116143 A1  May 19, 2011

(30) Foreign Application Priority Data

Nov. 13, 2009  (TW) .............................. 98138581 A

(51) Int. Cl.
  *H04N 1/04* (2006.01)
  *H04N 1/00* (2006.01)
  *G03G 15/00* (2006.01)
  *G03B 27/52* (2006.01)
(52) U.S. Cl. ........ 358/498; 358/474; 358/408; 358/496; 399/374; 399/367; 355/23; 355/24
(58) Field of Classification Search .................. 358/498, 358/474, 408, 496; 399/374, 367; 355/23, 355/24
See application file for complete search history.

(56) References Cited

U.S. PATENT DOCUMENTS

| 8,072,657 B2* | 12/2011 | Langrel et al. ................ 358/498 |
| 8,179,573 B2* | 5/2012 | Bokelman et al. ............ 358/474 |
| 2005/0213168 A1* | 9/2005 | Chen et al. .................... 358/474 |
| 2008/0038029 A1* | 2/2008 | Wang et al. .................... 399/374 |
| 2009/0161179 A1* | 6/2009 | Wang et al. .................... 358/498 |

FOREIGN PATENT DOCUMENTS

| CN | 1531324 A | 9/2004 |
| CN | 1625207 A | 6/2005 |

* cited by examiner

*Primary Examiner* — Charlotte M Baker
*Assistant Examiner* — Rury Grisham

(57) ABSTRACT

A sheet-fed double-sided document scanner is disclosed and includes a first image-capturing assembly, a second image-capturing assembly, a sheet-transporting mechanism, a power receiving interface, and a control circuit. The scanner switches scanning modes according to a power input. The sheet-transporting mechanism transports a document past the first image-capturing assembly and the second image-capturing assembly. The power receiving interface receives power. When a power level of the received power is less than a default threshold level, the control circuit controls the scanner to scan a first side and a second side of the document in a first mode. When the power level of the received power reaches the default threshold level, the control circuit controls the scanner to scan the first side and the second side of the document in a second mode.

9 Claims, 3 Drawing Sheets

SHEET-FED DOUBLE-SIDED DOCUMENT SCANNER CAPABLE OF CHANGING SCANNING MODES DEPENDENT ON POWER INPUT

CROSS-REFERENCE TO RELATED APPLICATION

This utility application claims priority to Taiwan Application Serial Number 098138581, filed Nov. 13, 2009, which is incorporated herein by reference.

BACKGROUND OF THE INVENTION

1. Field of the Invention

This invention relates to a sheet-fed double-sided document scanner and more particularly relates to a scanner scanning double sides of a document in different scanning modes according to different power levels of the power provided.

2. Description of the Prior Art

Usually, the double-sided document scanners could be classified into multi-pass scanners having an image-capturing assembly including an image sensor such as a CCD image sensor, and one-pass scanners having two image-capturing assemblies.

For the scan of a document by the one-pass scanner, the scanner transports a document past the two staggered image-capturing assemblies only once to complete the scan. However, because the multi-pass scanner has only one image-capturing assembly, the multi-pass scanner is required to be equipped with a sheet turning passage providing a sheet turning path for the document to return to the image-capturing assembly again. For the scan by the multi-pass scanner, the scanner scans the image of one side of the document when the document passes the image-capturing assembly at the first time. Then the document needs to be turned by the sheet turning passage to pass the image-capturing assembly again for completing the scan of the image of the other side of the document. In comparison, the scanning time of the one-pass scanner is shorter than that of the multi-pass scanner; on the contrary, the one-pass scanner activates the two image-capturing assemblies, so the power consumption is higher. In addition, although the power consumption for the multi-pass scanner is lower, the structure and sheet-transporting mechanism of the multi-pass scanner is more complicated.

As for the disposition of the scanner, the scanner is usually connected to a computer for transmitting a scanned image to the computer. A universal serial bus (USB) interface is adopted most often to be a connection interface. Furthermore, either the one-pass scanner or the multi-pass scanner has its own required driving power condition. If the working environment for the scanner is not able to provide the required driving power condition, the scanner will not work. Therefore, the conventional double-sided document scanner works only under a specific driving power condition. It lacks flexibility in use and is not user-friendly.

SUMMARY OF THE INVENTION

A scope of the invention is to provide a sheet-fed double-sided document scanner.

According to an embodiment of the invention, the sheet-fed double-sided document scanner includes a first image-capturing assembly, a second image-capturing assembly, a sheet-transporting mechanism, a power receiving interface, and a control circuit. The control circuit is coupled to the first image-capturing assembly, the second image-capturing assembly, the sheet-transporting mechanism, and the power receiving interface.

The sheet-transporting mechanism transports a document past the first image-capturing assembly and the second image-capturing assembly. The power receiving interface is for receiving power. The scanner receives the power through the power receiving interface from an external power source, or is connected to an electronic apparatus and receives the power from the electronic apparatus.

When a power level of the power received by the power receiving interface is less than a default threshold level, the control circuit controls the scanner to scan a first side and a second side of the document in a first mode. When the power level of the power received by the power receiving interface reaches the default threshold level, the control circuit controls the scanner to scan the first side and the second side of the document in a second mode.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1A:
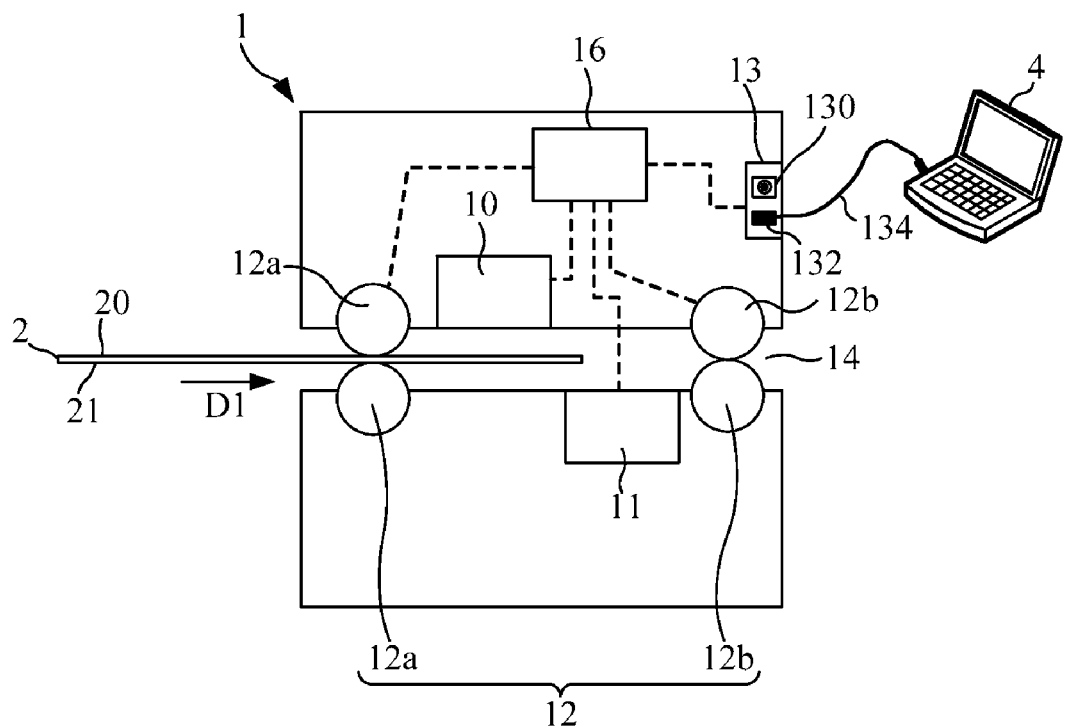
FIGS. 1A and 1B illustrate that a sheet-fed double-sided document scanner according to the invention scans a document in a first mode.

A scope of the invention is to provide sheet-fed double-sided document scanner, which scans double sides of a document in different scanning modes dependent on different power levels of the power provided. Therefore, the scanner of the invention, compared with a double-sided document scanner in the prior art, has the versatility and convenience desired by users.

Please refer to FIGS. 1A through 4. The sheet-fed double-sided document scanner 1 includes a first image-capturing assembly 10, a second image-capturing assembly 11, a sheet-transporting mechanism 12, a power receiving interface 13, a passage 14, and a control circuit 16. The control circuit 16 is connected to the first image-capturing assembly 10, the second image-capturing assembly 11, the sheet-transporting mechanism 12, and the power receiving interface 13 (shown in dashed line in the figures).

In the embodiment, the passage 14 includes a horizontal sheet-transporting path, but the invention is not limited to this. The passage 14 may include a curving sheet-transporting path. The first image-capturing assembly 10 and the second image-capturing assembly 11 are staggered at the opposite sides of the passage 14. The sheet-transporting mechanism 12 transports a document 2 through the passage 14. The sheet-transporting mechanism 12 includes two roller sets 12a and 12b disposed at two ends of the passage 14 for transporting the document 2 into the passage 14, past the first image-capturing assembly 10 and the second image-capturing assembly 11, and out of the passage 14. The power receiving interface 13 is for receiving power to drive the scanner 1. The power receiving interface 13 includes a power input port 130 for coupling with an external power source (e.g. an alternating current (AC) power source) and a transmission port 132 for coupling with a USB cable. The scanner 1 may receive the power through the power input port 130 from the external power source, or the scanner 1 may be connected through the USB cable to an electronic apparatus and receives the power from the electronic apparatus. For example, the electronic apparatus could be a computer 4 shown in FIGS. 1A and 1B.

Figure 3:
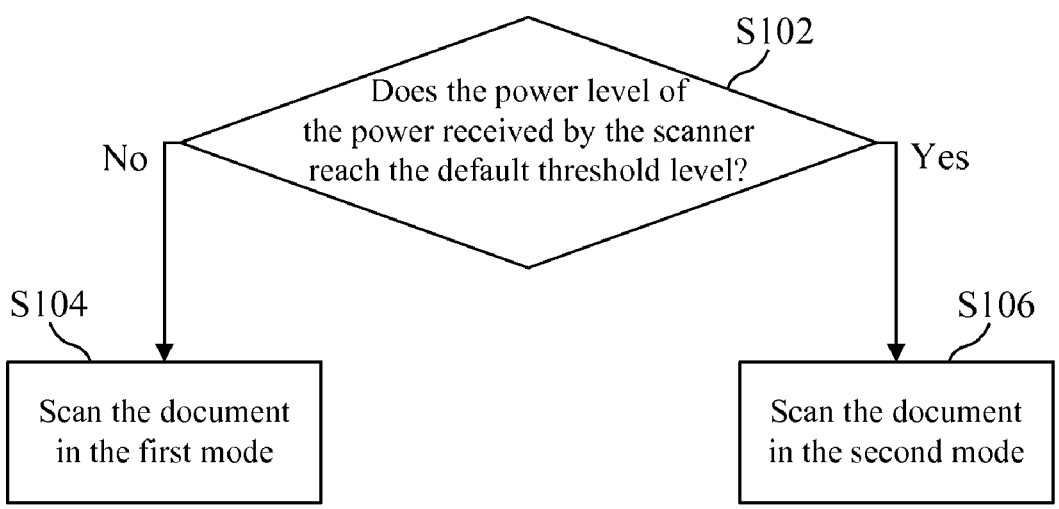
FIG. 3 is a scanning flow chart of the sheet-fed double-sided document scanner according to the invention.
Figure 4:
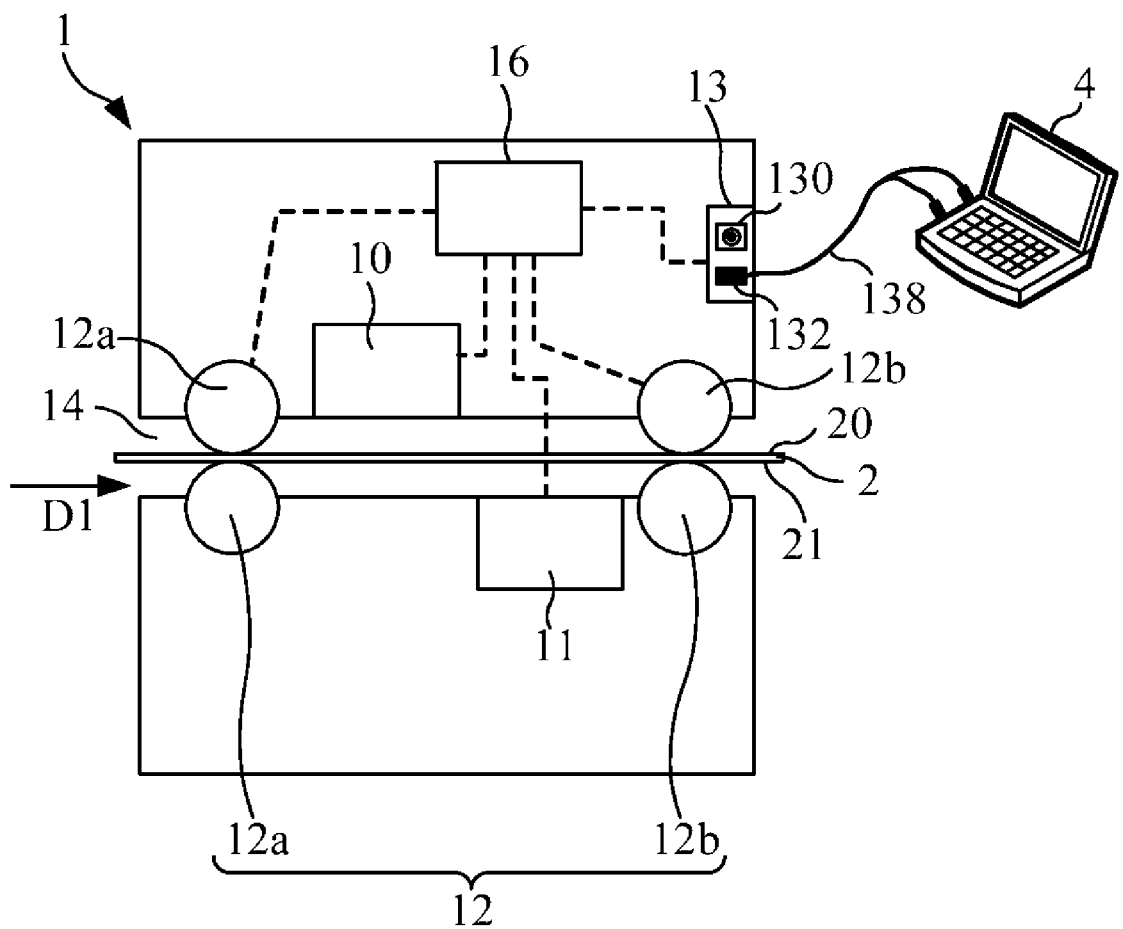
FIG. 4 illustrates that the sheet-fed double-sided document scanner according to the invention scans a document in the second mode in another embodiment.

Please refer to FIG. 3 together. It is noticeable that the scan of the document 2 is to be performed according to the condition of the power received through the power receiving interface 13, as shown in the step S102. When the power level of the power received by the power receiving interface 13 is less than a default threshold level, the control circuit 16 controls the scanner 1 to scan a first side and a second side of the document 2 in a first mode, as shown in the step S104. When the power level of the power received by the power receiving interface 13 reaches the default threshold level, the control circuit 16 controls the scanner 1 scans the first side and the second side of the document 2 in a second mode, as shown in the step S106.

The procedures for scanning the document 2 in the first mode and the second mode are described in detail by the following embodiments. Therein, the default threshold level is presented by a current threshold level, but the invention is not limited to this. Furthermore, the default current threshold level is 1 A (amp) for example.

Figure 1B:
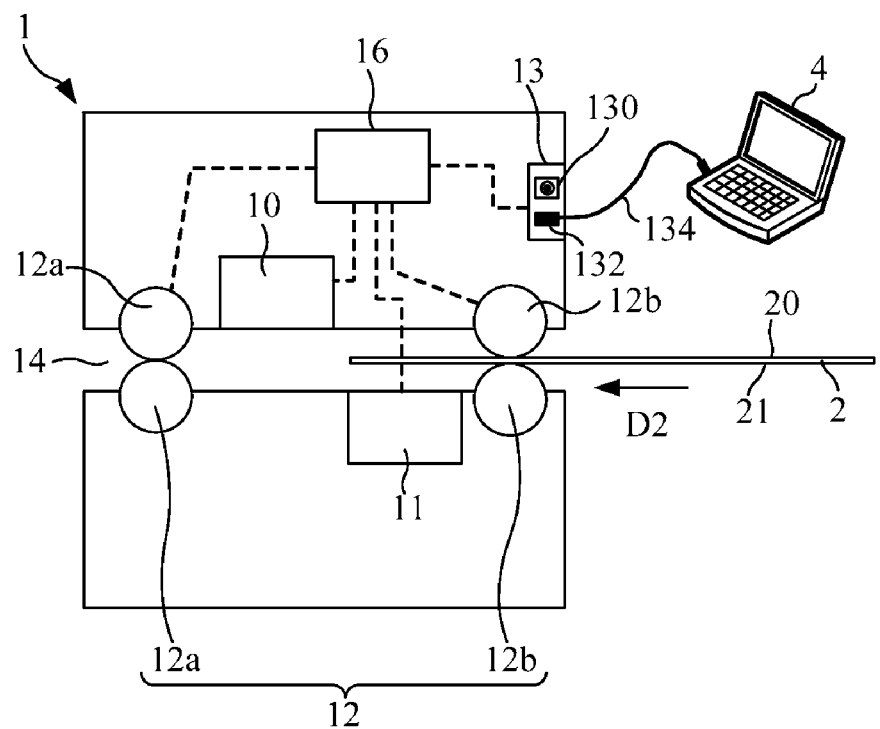

Please refer to FIGS. 1A and 1B, which illustrate that the sheet-fed double-sided document scanner 1 according to the invention scans the document 2 in the first mode in an embodiment.

In the embodiment, two ends of a single-input USB cable 134 are respectively inserted into the USB transmission port 132 of the power receiving interface 13 of the scanner 1 and a USB transmission port of the computer 4. Thereby, the power receiving interface 13 receives the power through the single-input USB cable 134 from the electronic apparatus 4. Because the power level of the power received by the scanner 1 through the single-input USB cable 134 is about 5 volts and the current in the specification of USB 2.0 is 500 mA at most, it is lower than the default threshold level, 1 A. In this case, the control circuit 16 controls the scanner 1 to scan the first side 20 and the second side 21 of the document 2 in the first mode.

As shown in FIG. 1A, in the first mode, the control circuit 16 controls the roller sets 12a and 12b to transport the document 2 in a first direction D1 past the first image-capturing assembly 10, such that the first image-capturing assembly 10 captures the image of the first side 20 of the document 2. Afterwards, as shown in FIG. 1B, the control circuit 16 controls the roller sets 12a and 12b to transport the document 2 in a second direction D2 opposite to the first direction D1 past the second image-capturing assembly 11, such that the second image-capturing assembly 11 captures the image of the second side 21 of the document 2. The double-sided document scan is therefore completed.

Figure 2:
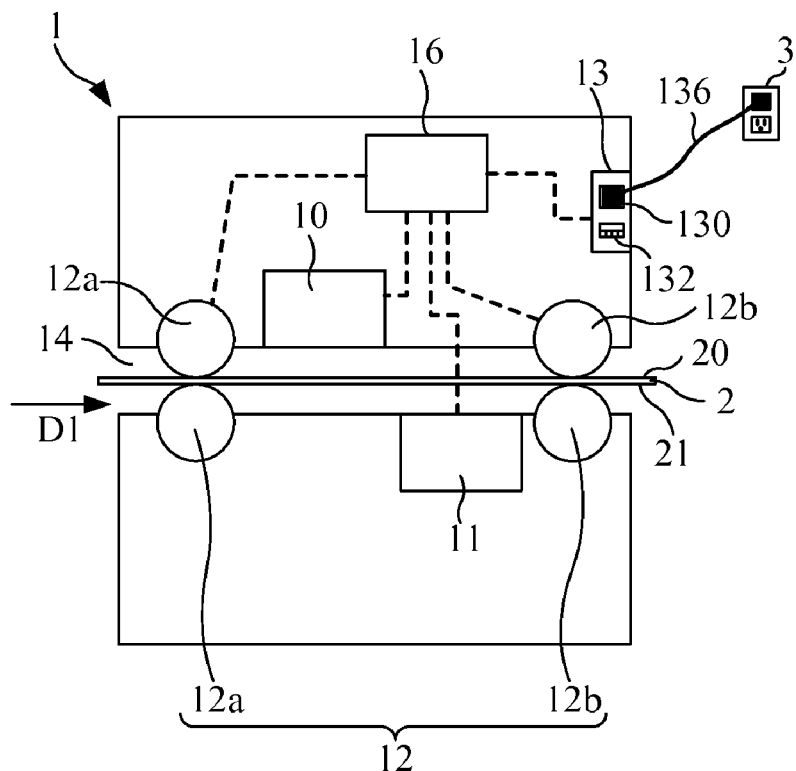
FIG. 2 illustrates that the sheet-fed double-sided document scanner according to the invention scans a document in a second mode in an embodiment.

Please refer to FIG. 2, which illustrates that the sheet-fed double-sided document scanner 1 according to the invention scans the document 2 in the second mode in an embodiment.

In the embodiment, two ends of a power cable 136 are respectively inserted into the power input port 130 of the power receiving interface 13 of the scanner 1 and a commercial power socket 3. Thereby, the power receiving interface 13 receives AC power for the commercial power through the power cable 136. In a practical application, the power input port 130 could be a plug-in socket for a direct current (DC) power source. The power cable 136 includes an AC/DC power converter for converting the received AC power from the commercial power socket 3 into DC power, but it is not limited to this. Because the current provided by the commercial power could reach the default threshold level 1 A, the control circuit 16 controls the scanner 1 to scan the first side 20 and the second 21 of the document 2 in the second mode.

In the second mode, the control circuit 16 controls the roller sets 12a and 12b to transport the document 2 in the first direction D1 past the first image-capturing assembly 10 and the second image-capturing assembly 11, such that the first image-capturing assembly 10 and the second image-capturing assembly 11 capture the images of the first side 20 and the second side 21 of the document 2. The double-sided scan is therefore completed.

Please refer to FIG. 4 again, which illustrates that the sheet-fed double-sided document scanner 1 according to the invention scans the document 2 in the second mode in another embodiment.

In the embodiment, the scanner 1 is designed to be powered through a dual-input USB cable. The connector of an end of a dual-input USB cable 138 is inserted into the USB transmission port 132 of the power receiving interface 13 of the scanner 1, and two connectors of the other end is inserted into two USB transmission ports of the computer 4, so that the power receiving interface 13 receives the power through the dual-input USB cable 138 from the computer 4.

Because one input of the dual-input USB cable 138 provides power transmission and data transmission, and the other input provides only power transmission, the current provided by the dual-input USB cable 138 could reach the default threshold level, 1 A. In this case, the control circuit 16 controls the scanner 1 to scan the first side 20 and the second side 21 of the document 2 in the second mode.

As discussed above, the sheet-fed double-sided document scanner of the invention can flexibly operate with a variety of power supplies, such as an AC power from commercial power source, or power supply through the single-input USB cable or the dual-input USB cable, and switch the scanning modes according to the power received from different power supplies. Therefore, the sheet-fed double-sided document scanner of the invention is not like the double-sided document scanner in the prior art that works only when powered by a specific input current. In addition, the sheet-fed double-sided document scanner of the invention does not need to incorporate the sheet turning passage as the multi-pass scanner does. Besides, the structure design thereof is simplified.

With the example and explanations above, the features and spirits of the invention will be hopefully well described. Those skilled in the art will readily observe that numerous modifications and alterations of the device may be made while retaining the features and spirit of the invention. Accordingly, the above disclosure should be construed as limited only by the metes and bounds of the appended claims.

What is claimed is:

1. An sheet-fed double-sided document scanner, comprising:
   a first image-capturing assembly;
   a second image-capturing assembly;
   a sheet-transporting mechanism, for transporting a document past the first image-capturing assembly and the second image-capturing assembly;
   a power receiving interface, for receiving power; and
   a control circuit, coupled to the first image-capturing assembly, the second image-capturing assembly, the sheet-transporting mechanism, and the power receiving interface;

wherein, when a power level of the power is less than a default threshold level, the control circuit controls the scanner to scan a first side and a second side of the document in a first mode, and when the power level of the power reaches the default threshold level, the control circuit controls the scanner to scan the first side and the second side of the document in a second mode.

2. The scanner of claim 1, wherein in the first mode the control circuit controls the sheet-transporting mechanism to transport the document in a first direction past the first image-capturing assembly for capturing an image of the first side of the document, and the control circuit then controls the sheet-transporting mechanism to transport the document in a second direction opposite to the first direction past the second image-capturing assembly for capturing an image of the second side of the document.

3. The scanner of claim 1, wherein in the second mode the control circuit controls the sheet-transporting mechanism to transport the document in a first direction past the first image-capturing assembly and the second image-capturing assembly for capturing images of the first side and the second side of the document.

4. The scanner of claim 1, wherein the power receiving interface is for coupling with a power input port of an external power source, and the power level of the power received by the power receiving interface from the external power source reaches the default threshold level.

5. The scanner of claim 4, wherein the power input port is a plug-in socket for a direct current power source.

6. The scanner of claim 1, wherein the power receiving interface comprises a transmission port for coupling with a universal serial bus (USB) cable, and the scanner is connected through the USB cable to an electronic apparatus.

7. The scanner of claim 6, wherein the USB cable is a USB cable having dual input ports, and the power level of the power received from the electronic apparatus through the USB cable by the power receiving interface reaches the default threshold level.

8. The scanner of claim 6, wherein the power level of the power received through the USB cable by the power receiving interface from the electronic apparatus is less than the default threshold level.

9. The scanner of claim 1, wherein the default threshold level is a current threshold level.

* * * * *